March 12, 1946.  R. J. WOODS  2,396,628
AIRPLANE
Filed Nov. 7, 1941  3 Sheets-Sheet 1

INVENTOR
ROBERT J. WOODS
BY
Beau, Brooks, Buckley, Beau.
ATTORNEYS

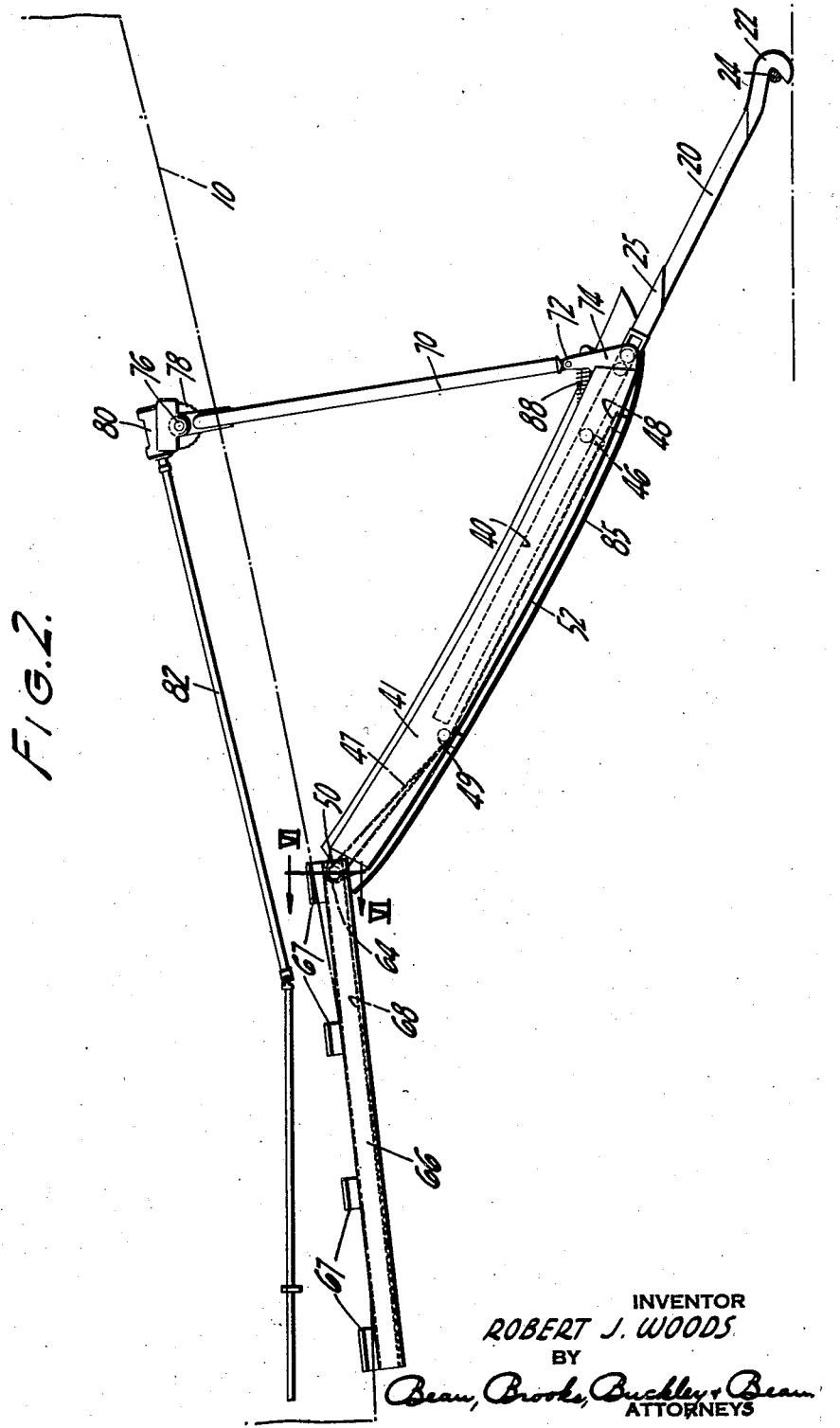

March 12, 1946.  R. J. WOODS  2,396,628
AIRPLANE
Filed Nov. 7, 1941  3 Sheets-Sheet 3

INVENTOR
ROBERT J. WOODS
BY
Bean, Brooks, Buckley & Bean
ATTORNEYS

Patented Mar. 12, 1946

2,396,628

UNITED STATES PATENT OFFICE 2,396,628

AIRPLANE

Robert J. Woods, Grand Island, N. Y., assignor to Bell Aircraft Corporation, Buffalo, N. Y.

Application November 7, 1941, Serial No. 418,149

18 Claims. (Cl. 244—110)

This invention relates to aircraft and more particularly to means for arresting the forward motion of an airplane after it contacts a landing surface.

One of the objects of the invention is to provide a device of the character described which is particularly adapted to operate in an improved manner in connection with an airplane having a tricycle type landing gear. Another object of the invention is to provide a device of the character described which is particularly adapted to operate in an improved manner in connection with an airplane having a pusher type engine-propeller arrangement. Another object of the invention is to provide a device of the character described which is particularly adapted to operate in an improved manner in connection with a pusher airplane having a tricycle type landing gear. Another object of the invention is to provide a device of the character described which is particularly adapted to operate in an improved manner in cooperation with a cable stretched adjacent the landing surface transversely of the path of airplane motion, such as on the landing deck of an airplane carrying sea vessel. Another object of the invention is to provide a device of the character described which is adapted to be extended and retracted between operative and inoperative positions in an improved manner. Other objects and advantages of the invention will appear from the specification hereinafter.

In the drawings:

Fig. 2 is an enlarged view of the motion arresting device and operative mechanism therefor;

Figure 1:
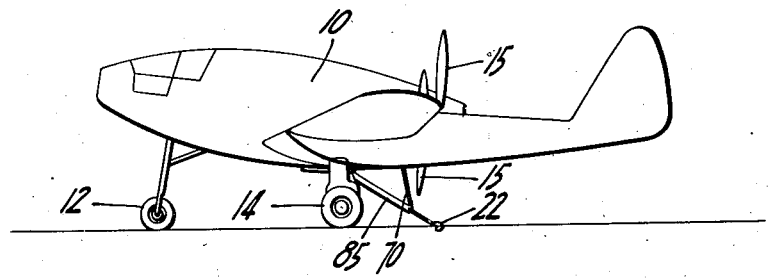
Fig. 1 is a side elevation of a pusher type airplane having a tricycle landing gear and a motion arresting device of the invention shown in extended position.

The invention is illustrated in connection with an airplane having a fuselage or nacelle designated generally at 10 and a tricycle landing gear comprising a nose wheel 12 and a pair of spaced rear wheels 14 in accord with usual tricycle landing gear practice. The airplane is provided with a pusher type engine and propeller arrangement whereby propellers 15 are arranged to be driven by an engine disposed interiorly of the airplane fuselage. Thus, the propellers follow the trailing edge of the main wing of the airplane, and the propeller arc extends below the fuselage-wing structures as shown (Fig. 1).

Figure 5:
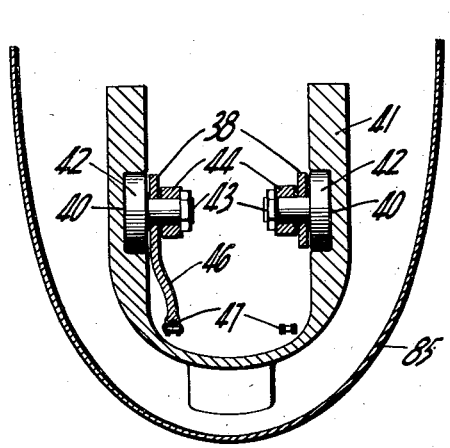
Fig. 5 is a section taken substantially along the line V—V of Fig. 3.

The motion arresting device includes an arm 20 terminating in a downwardly and forwardly faced hook portion 22 so as to be adapted to engage behind a cable such as is indicated at 24 which has been stretched to extend across the deck of an aircraft carrier landing surface or the like (Fig. 2). The cable 24 is disposed to extend transversely of the direction of airplane motion subsequent to its landing upon the deck of the carrier. At its forward end, the arm 20 is carried by means of a sheath 25 which terminates in a clevis portion 26. A bolt 28 pivotally connects the clevis portion 26 to a block 30 which carries a laterally extending lever arm 32 as an integral portion thereof. The block 30 is provided with laterally extending pins 34 which engage corresponding bored portions 36—36 of a pair of actuating arms 38—38. Rollers 39—39 are carried at opposite sides of the arms 38—38 and rotatably engage within corresponding inwardly recessed portions 40—40 of a channel-like frame member 41 (Fig. 5). At their other ends the arms 38—38 are similarly mounted relative to the frame 41 by means of rollers 42—42 carried by pins 43—43 extending from a spacer bracket 44. A spacer bolt 45 extends between the arms 38—38 at their other ends to complete a rigidly braced unit. Thus, the block 30 is longitudinally displaceable relative to the frame 41 so as to be adapted to telescopically retract the hook arm 20 therewithin. Also, the hook arm 20 is pivotable laterally relative to the block 30 whenever the hook arm is in extended position, and the hook arm 20 and the block 30 are pivotable as a unit in vertical directions relative to the channel frame 41.

Figure 6:
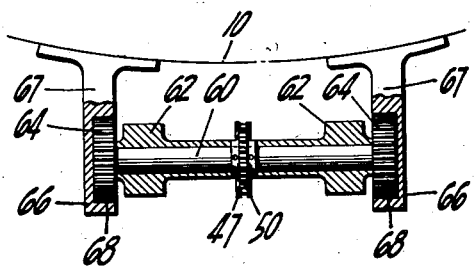
Fig. 6 is a section taken substantially along line VI—VI of Fig. 2.

A lug 46 is formed to extend downwardly therefrom as an integral portion of one of the side arms 38 for connection at its lower end to an endless chain 47. The chain 47 is carried by means of sprockets 48, 49 and 50 which are in turn rotatably mounted upon the frame structure 41. The upper sprocket 50 is carried by a shaft 60 (Fig. 6) mounted upon bearing portions 62 of the frame member 41 so as to extend beyond opposite ends thereof and to carry thereat pinions 64—64 in keyed relation therewith. The pinions 64—64 are rotatably carried upon inwardly recessed side wall portions of a pair of corresponding rails 66 extending below the airplane fuselage 10, as by means of brackets 67. The rails 66—66 are toothed at their lower recessed surface portions 68 so as to engage with the pinions 64—64 in geared relation.

Figure 7:
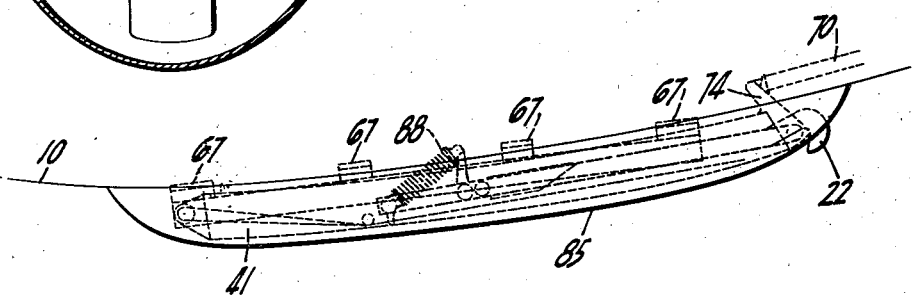
Fig. 7 is a side view of the arresting device in fully retracted position.

The rails 66—66 extend longitudinally of the airplane for a distance sufficient to allow the pinions 64—64 to travel from the position thereof shown in Fig. 2 (or from arresting gear extended position) forwardly thereof so that the frame 41 may be completely nested in telescoped relation between the rails 66—66 upon retraction of the arresting gear (Fig. 7). A retraction mechanism is provided as comprising a retraction strut 70 which is pivotally connected as at 72 to a lug portion 74 extending upwardly from the frame 41 as an integral portion thereof. At its upper end the strut 70 is pivotally mounted upon the airplane fuselage by means of a pin 76 (Fig. 2), and a gear 78 is keyed to the strut 70 so as to rotate therewith about the axis of the pin 76. A worm is arranged at 80 in mesh with the gear 78 and is arranged to be driven by rotation of a control member 82 leading forwardly to the pilot compartment of the airplane so as to be manually operable between gear extended and gear retracted positions while the airplane is in flight.

Thus, it will be understood that upon manual rotation of the control member 82 the strut 70 may be driven to rotate in clockwise direction as viewed in Fig. 2 about the axis of the pin 76, thereby forcing the upper end of the frame 41 to move to the left relative to the rails 66—66 until such time as the lower end portion of the frame 41 is lifted by the strut 70 so as to be disposed within the rear end portion of the rail structure 66—66. An outwardly streamlined casing 85 is mounted upon the frame 41 to enclose the mechanism and to complement the contour of adjacent portions of the fuselage when the gear is in completely retracted position (Fig. 7). Thus, upon retraction of the arresting gear the streamline casing 85 will completely envelope the rail structure 66—66 and the frame 41 with a streamlined enclosure for maximum aerodynamic performance.

It will be understood that upon movement of the upper end portion of the frame 41 relative to the rail structure 66—66 in right-to-left direction as viewed in Fig. 2, the pinions 64—64 will be thereby caused to rotate by reason of their geared engagement with the rack portions of the rails in such manner that the chain sprocket 50 will be rotated in a counterclockwise direction as viewed in the figure. Thus, the upper strand of the chain 47 will be moved toward the left relative to the frame 41, and consequently, through means of the connection of the lug 45 the side arm members 38—38 the hook arm 20 will be dragged inwardly of the frame 41 so as to be completely telescoped therewithin upon arrival of the frame at completely retracted position relative to the airplane fuselage. Upon reverse movement of the control member 82 so as to actuate the arresting gear from its retracted position to its extended position the strut 70 will be actuated in opposite direction and in such manner as to move the frame 41 rearwardly and downwardly toward the position thereof as shown in Fig. 2, while the chain 47 will be thereby simultaneously actuated to cause the hook arm 20 to move automatically out of telescoped position within the frame to the position thereof of Fig. 2.

Figure 3:
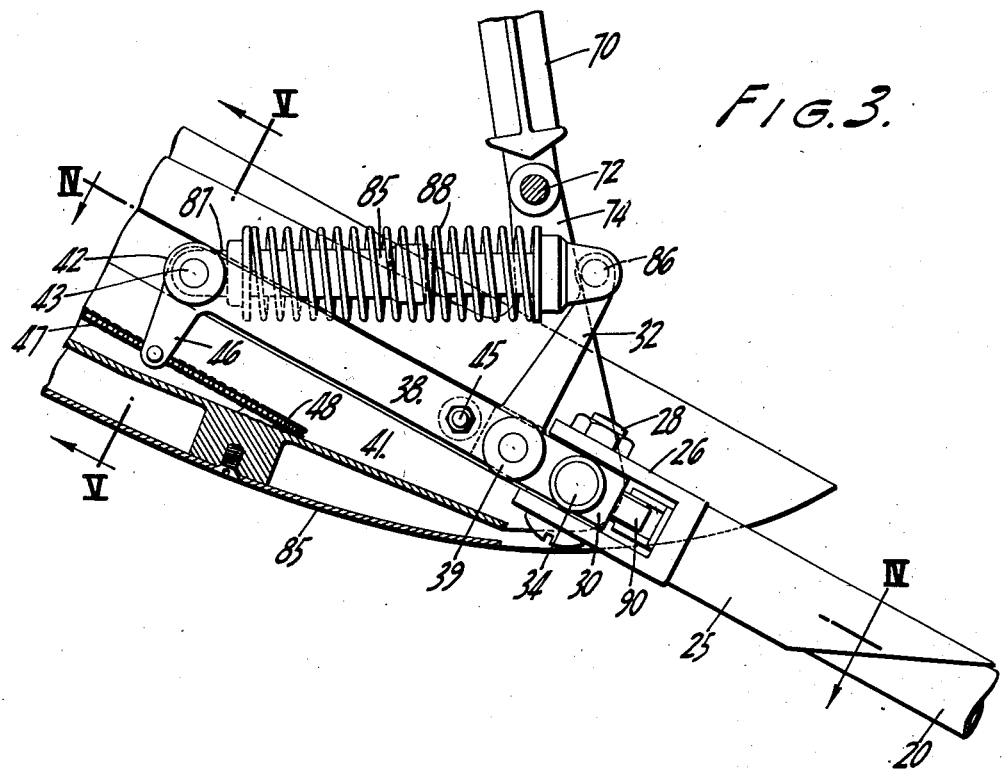
Fig. 3 is an enlarged view of a detail of Fig. 2, with portions of the casing structure broken away to show the interior thereof.
Figure 4:
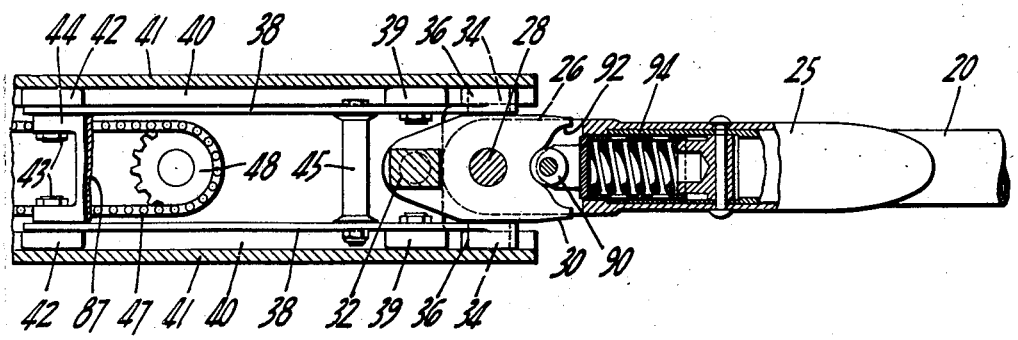
Fig. 4 is a section taken substantially along line IV—IV of Fig. 3.

To control the vertical disposition of the hook arm 20 in connection with airplane arresting operation thereof, a shock absorbing device is connected to the upper end of the arm 32 extending from the block 30. As illustrated in Fig. 3, the shock absorbing device may comprise a telescopic strut device 85 which is pivotally connected at one end by means of a pin 86 to the arm 32, and at its other end to the bracket 44 which is carried by the pins 43—43 of the side arm structure. A compression spring 88 is arranged to bear at its opposite ends against abutment portions of the strut device 85, so that when the hook 22 meets the cable 24 the rearwardly directed forces acting through the hook arm 20 will be translated into rotation of the arm 20 about the axis of rotation of the pivot pins 34—34 so as to absorb the forces within the spring 88. Thus, the shock of the airplane arresting operation is absorbed to some extent by the spring device 88, but it will of course be understood that additional shock absorbing spring devices or the like will preferably be employed in connection with the arresting cable 24 so that the latter will function as an elastic member upon initial impact thereagainst of arresting hook 22. It will also be understood that the spring device 88 is adapted to control the hook arm 20 in such manner as to allow it to automatically adjust itself to inequalities of the landing surface as the airplane proceeds thereon while insuring maintenance of close contact between the hook end portion and the landing surface at all times. Thus, the hook is prevented from bouncing relative to the landing surface in such manner as might otherwise result in missing of connection between the hook and the cable during a landing maneuver.

It will be understood that when the hook arm 20 is in fully extended position it is adapted to engage upon the cable 24 to arrest forward motion of the airplane relative to the landing surface, and that in connection with such operation the arm 20 is free to pivot laterally relative to the frame 41 through means of the pivot pin connection at 28; whereby the gear mechanism is protected against obliquely directed forces such as are imposed thereupon whenever the landing airplane does not meet the cable in perfectly head-on relation.

To assist in this respect a self-centering device is arranged in connection with the block 30 and the hook arm 20 in the form of a detent 90 having a roller bearing end portion engaging a symmetrically recessed cam surface portion 92 of the block 30. A compression spring 94 is arranged within the arm 20 to urge the detent against the cam surface 92 in such manner as to always influence the arm 20 to return to normal or straight-line relation with respect to the frame 41 whenever it is deflected therefrom.

Thus, it will be appreciated that a particular feature and advantage of the arresting hook of the invention resides in the fact that when the arresting gear is in extended position preparatory to landing of the airplane the hook arm 20 is so disposed as to positively shield the propeller blades from contact with the arresting cable 24 even though the propeller arc extends a substantial distance below the bottom line of the airplane fuselage. Thus, fouling of the propeller blades by the cable is positively prevented by means of a gear that is adapted to retract and nest compactly against the bottom of the fuselage during flight operations in such manner as to provide a minimum of resistance to the relative airstream. Also, it will be understood and appreciated that the gear of the invention is adapted to function automatically in an improved manner, and yet it is of simple and rugged construction and fool-proof in operation; and that although only one form of the invention has been shown and described in detail, it will be apparent to those skilled in the art that the invention is not so limited but that various changes may be made therein without departing from the spirit of the invention or the scope of the appended claims.

What is claimed is:

1. In an airplane having a fuselage, a rail carried by said fuselage, a frame member mounted telescopically upon said rail, a hook arm mounted telescopically upon said frame for extension from said frame into cable connection position, means for actuating said hook arm relative to said frame between telescopically extended and retracted positions, and means operatively coupling said hook arm and said frame and said rail for automatically actuating said frame telescopically relative to said rail upon actuation of said hook arm telescopically relative to said frame.

2. In an airplane having a fuselage, a landing motion arresting gear including a rail carried by said fuselage and extending longitudinally thereof, a frame member mounted telescopically upon said rail, a hook arm mounted telescopically upon said frame for extension from said frame into position for connection with a motion arresting cable, means for actuating said hook arm relative to said frame between extended and retracted positions, and means operatively coupling said hook arm and said frame and said rail for automatically actuating said frame telescopically relative to said rail upon actuation of said hook arm telescopically.

3. In an airplane having a fuselage, a landing motion arresting gear including a rail carried by said fuselage and extending longitudinally thereof, a frame member mounted to move upon said rail, a hook arm mounted pivotally and telescopically upon said frame for extension from said frame into position for connection with a motion arresting cable, pivoting strut means for actuating said hook arm relative to said frame between extended and retracted positions, and gear means operatively coupling said hook arm and said frame and said rail for automatically actuating said frame telescopically relative to said rail upon actuation of said hook arm telescopically relative to said frame.

4. In an airplane having a fuselage, a rail carried by said fuselage, a frame member mounted telescopically upon said rail, a hook arm mounted telescopically upon said frame for extension from said frame into cable connection position, means for actuating said hook arm relative to said frame between telescopically extended and retracted positions, and means operatively coupling said hook arm and said frame and said rail for automatically actuating said frame telescopically relative to said rail upon actuation of said hook arm telescopically relative to said frame, and a streamline casing mounted upon said frame to enclose said rail and frame hook arm elements when in nested telescopic positions against said fuselage.

5. In an airplane having a fuselage, a landing motion arresting gear including a rail carried by said fuselage and extending longitudinally thereof, a frame member mounted telescopically upon said rail, a hook arm mounted telescopically upon said frame for extension from said frame into position for connection with a motion arresting cable, means for actuating said hook arm relative to said frame between extended and retracted positions, and means operatively coupling said hook arm and said frame and said rail for automatically actuating said frame telescopically relative to said rail upon actuation of said hook arm telescopically relative to said frame, and a streamline casing mounted upon said frame to enclose said rail and frame hook arm elements when in nested telescopic positions against said fuselage.

6. In an airplane having a fuselage, a landing motion arresting gear including a rail carried by said fuselage and extending longitudinally thereof, a frame member mounted to move upon said rail, a hook arm mounted pivotally and telescopically upon said frame for extension from said frame into position for connection with a motion arresting cable, pivoting strut means for actuating said hook arm relative to said frame between extended and retracted positions, and gear means operatively coupling said hook arm and said frame and said rail for automatically actuating said frame telescopically relative to said rail upon actuation of said hook arm telescopically relative to said frame, and a streamline casing mounted upon said frame to enclose said rail and frame hook arm elements when in nested telescopic positions against said fuselage.

7. In an airplane having a fuselage, a landing motion arresting gear including a rail carried by said fuselage and extending longitudinally thereof, a frame member mounted to move upon said rail, a hook arm mounted telescopically upon said frame for extension from said frame into position for connection with a motion arresting cable, means for actuating said hook arm relative to said frame between extended and retracted positions, and endless chain means operatively coupling said hook arm and said frame and said rail for automatically actuating said frame telescopically relative to said rail upon actuation of said hook arm telescopically relative to said frame.

8. In an airplane having a fuselage, a rail carried by said fuselage and extending longitudinally thereof, a frame member mounted telescopically upon said rail, a hook arm mounted telescopically upon said frame for extension from said frame into cable connection position, means for actuating said hook arm relative to said frame between telescopically extended and retracted positions, chain means operatively coupling said hook arm and said frame so as to be actuated in response to relative movement therebetween, gear means coupling said rail and said frame and arranged to be driven by said chain for automatically actuating said frame telescopically relative to said rail upon actuation of said hook arm telescopically relative to said frame.

9. In an airplane having a fuselage and a pusher-type motor-propeller arrangement whereby the propeller devices of said airplane mount behind said fuselage, a landing motion arresting gear including a rail carried by said fuselage and extending longitudinally thereof forwardly of said propeller devices, a frame member mounted telescopically upon said rail, a hook arm mounted telescopically upon said frame for extension from said frame to a position below and forwardly of said propeller devices for arresting cable connection purposes, strut means for actuating said hook arm relative to said frame between extended and retracted positions and to act as a diagonal brace for said hook arm relative to said fuselage when said arm is in extended position, and means operatively coupling said hook arm and said frame and said rail for automatically actuating said frame telescopically relative to said rail upon actuation of said hook arm telescopically relative to said frame.

10. In an airplane having a fuselage and a pusher-type motor propeller arrangement whereby the propeller devices of said airplane mount behind said fuselage, a landing motion arresting gear including a rail carried by said fuselage and extending longitudinally thereof, a frame member mounted telescopically upon said rail, a hook arm mounted telescopically upon said frame by means of a sliding block bearing device for extension from said frame to a position below and forwardly of said propeller devices for arresting cable connection purposes while guarding said propeller devices from contact with said cable, means for actuating said hook arm relative to said frame between extended and retracted positions, means operatively coupling said hook arm and said frame and said rail for automatically actuating said frame telescopically relative to said rail upon actuation of said hook arm telescopically relative to said frame, said block bearing device being pivotable for oscillation of said hook arm vertically relative to said frame when in extended positions.

11. In an airplane having a fuselage and a pusher-type motor propeller arrangement whereby the propeller devices of said airplane mount behind said fuselage, a landing motion arresting gear including a rail carried by said fuselage and extending longitudinally thereof, a frame member mounted telescopically upon said rail, a hook arm mounted telescopically upon said frame by means of a sliding block bearing device for extension from said frame to a position below and forwardly of said propeller devices for arresting cable connection purposes while guarding said propeller devices from contact with said cable, means for actuating said hook arm relative to said frame between extended and retracted positions, means operatively coupling said hook arm and said frame and said rail for automatically actuating said frame telescopically relative to said rail upon actuation of said hook arm telescopically relative to said frame, said block bearing device being pivotable for oscillation of said hook arm vertically relative to said frame when in extended positions, and elastic force means coupling said hook arm and said frame for biasing said hook arm into cable connecting position.

12. In an airplane having a fuselage and a pusher-type motor-propeller arrangement whereby the propeller devices of said airplane mount behind said fuselage, a landing motion arresting gear including a rail carried by said fuselage and extending longitudinally thereof forwardly of said propeller devices, a frame member mounted telescopically upon said rail, a hook arm mounted telescopically upon said frame for extension from said frame to a position below and forwardly of said propeller devices for arresting cable connection purposes, strut means for actuating said hook arm relative to said frame between extended and retracted positions and to act as a diagonal brace for said hook arm relative to said fuselage when said arm is in extended position, and means operatively coupling said hook arm and said frame and said rail for automatically actuating said frame telescopically relative to said rail upon actuation of said hook arm telescopically relative to said frame, and a streamline casing mounted upon said frame to enclose said hook arm and said frame and said rail in nested relation against said fuselage when said gear is in fully retracted position.

13. In an airplane having a fuselage and a pusher-type motor propeller arrangement whereby the propeller devices of said airplane mount behind said fuselage, a landing motion arresting gear including a rail carried by said fuselage and extending longitudinally thereof, a frame member mounted telescopically upon said rail, a hook arm mounted telescopically upon said frame by means of a sliding block bearing device for extension from said frame to a position below and forwardly of said propeller devices for arresting cable connection purposes while guarding said propeller devices from contact with said cable, means for actuating said hook arm relative to said frame between extended and retracted positions, means operatively coupling said hook arm and said frame and said rail for automatically actuating said frame telescopically relative to said rail upon actuation of said hook arm telescopically relative to said frame, said block bearing device being pivotable for oscillation of said hook arm vertically relative to said frame when in extended positions, and a streamline casing mounted upon said frame to enclose said hook arm and said frame and said rail in nested relation against said fuselage when said gear is in fully retracted position.

14. In an airplane having a fuselage and a pusher-type motor propeller arrangement whereby the propeller devices of said airplane mount behind said fuselage, a landing motion arresting gear including a rail carried by said fuselage and extending longitudinally thereof, a frame member mounted telescopically upon said rail, a hook arm mounted telescopically upon said frame by means of a sliding block bearing device for extension from said frame to a position below and forwardly of said propeller devices for arresting cable connection purposes while guarding said propeller devices from contact with said cable, means for actuating said hook arm relative to said frame between extended and retracted positions, means operatively coupling said hook arm and said frame and said rail for automatically actuating said frame telescopically relative to said rail upon actuation of said hook arm telescopically relative to said frame, said block bearing device being pivotable for oscillation of said hook arm vertically relative to said frame when in extended positions, and elastic force means coupling said hook arm and said frame for biasing said hook arm into cable connecting position, and a streamline casing mounted upon said frame to enclose said hook arm and said frame and said rail in nested relation against said fuselage when said gear is in fully retracted position.

15. In an airplane having a fuselage and a pusher-type motor propeller arrangement whereby the propeller devices of said airplane mount behind said fuselage, a landing motion arresting gear including a rail carried by said fuselage and extending longitudinally thereof, a frame member mounted telescopically upon said rail, a hook arm mounted telescopically upon said frame by means of a sliding block bearing device for extension from said frame to a position below and forwardly of said propeller devices for arresting cable connection purposes while guarding said propeller devices from contact with said cable, means for actuating said hook arm relative to said frame between extended and retracted positions, means operatively coupling said hook arm and said frame and said rail for automatically actuating said frame telescopically relative to said rail upon actuation of said hook arm telescopically relative to said frame, said block bearing device being pivotable for oscillation of said hook arm vertically relative to said frame when in extended positions, and elastic force means coupling said hook arm and said frame for biasing said hook arm into cable connecting position in all directions transversely of the direction of said hook arm extension.

16. In an airplane having a fuselage, a landing motion arresting gear including a rail carried by said fuselage and extending longitudinally thereof, a frame member mounted telescopically upon said rail, a hook arm mounted telescopically upon said frame for extension from said frame into position for connection with a motion arresting cable, means for actuating said hook arm relative to said frame between extended and retracted positions, and means operatively coupling said hook arm and said frame and said rail for automatically actuating said frame telescopically relative to said rail upon actuation of said hook arm telescopically relative to said frame, and elastic connection means coupling said hook arm and said frame whereby said hook arm is deflectable in response to cable contacting forces in all directions transversely of the direction of said hook arm extension.

17. In an airplane having a fuselage, a landing motion arresting gear including a rail carried by said fuselage and extending longitudinally thereof, a frame member mounted to move upon said rail, a hook arm mounted pivotally and telescopically upon said frame for extension from said frame into position for connection with a motion arresting cable, pivoting strut means for actuating said hook arm relative to said frame between extended and retracted positions, and gear means operatively coupling said hook arm and said frame and said rail for automatically actuating said frame telescopically relative to said rail upon actuation of said hook arm telescopically relative to said frame, and elastic connection means coupling said hook arm and said frame whereby said hook arm is deflectable in response to cable contacting forces in all directions transversely of the direction of said hook arm extension.

18. In an airplane having a fuselage and a pusher-type motor-propeller arrangement whereby the propeller devices of said airplane mount behind said fuselage, a landing motion arresting gear including a rail carried by said fuselage and extending longitudinally thereof forwardly of said propeller devices, a frame member mounted telescopically upon said rail, a hook arm mounted telescopically upon said frame for extension from said frame to a position below and forwardly of said propeller devices for arresting cable connection purposes, strut means for actuating said hook arm relative to said frame between extended and retracted positions and to act as a diagonal brace for said hook arm relative to said fuselage when said arm is in extended position, and means operatively coupling said hook arm and said frame and said rail for automatically actuating said frame telescopically relative to said rail upon actuation of said hook arm telescopically relative to said frame, and elastic connection means coupling said hook arm and said frame whereby said hook arm is deflectable in response to cable contacting forces in all directions transversely of the direction of said hook arm extension.

ROBERT J. WOODS.